(12) United States Patent
Clement (10) Patent No.: US 6,260,428 B1
(45) Date of Patent: Jul. 17, 2001

(54) Z-AXIS PRECISION POSITIONER

(76) Inventor: Donald W. Clement, 8504 Summerdale Rd., #15, San Diego, CA (US) 92126

( * ) Notice: Subject to any disclaimer, the term of this patent is extended or adjusted under 35 U.S.C. 154(b) by 0 days.

(21) Appl. No.: 09/392,970

(22) Filed: Sep. 9, 1999

(51) Int. Cl.[7] ............................. F16H 25/20; A47B 9/16; A47B 9/10
(52) U.S. Cl. ............................. 74/89.45; 16/226; 33/568; 108/115; 108/116; 108/145; 108/147; 248/150
(58) Field of Search ................................. 74/89.15, 89.23, 74/89.45; 16/225, 226; 108/115, 116, 145, 147; 248/132, 150, 462; 33/568

(56) References Cited

U.S. PATENT DOCUMENTS

| | | | | |
|---|---|---|---|---|
| 652,720 | * | 6/1900 | Merriman | 108/115 |
| 1,088,419 | * | 2/1914 | Heyer | 248/421 |
| 2,565,187 | * | 8/1951 | Udell | 108/115 |
| 3,058,226 | * | 10/1962 | Michael | 33/568 |
| 3,188,078 | * | 6/1965 | Peterson | 269/305 |
| 3,709,311 | * | 1/1973 | Appius | 177/203 |
| 4,135,305 | * | 1/1979 | Krause | 33/570 |
| 4,303,018 | * | 12/1981 | Lehmann | 108/12 |
| 5,408,750 | * | 4/1995 | Teng et al. | 33/1 M |
| 5,420,489 | * | 5/1995 | Hansen et al. | 318/568.18 |

* cited by examiner

Primary Examiner—Allan D. Herrmann
(74) Attorney, Agent, or Firm—Albert O. Cota

(57) ABSTRACT

A z-axis positioner that maintains precise parallel relationship between a triangular top platform (24) and a mating bottom platform (30) juxtipositioned with each other, when separated in the z-axis. Three rectangular hinge plate sets (32) and (36) are attached with flexural strip hinges (40) in crossed pairs to opposite sides of the platforms and hinge plates such that the top and bottom platforms maintain the parallel relationship when separated without of any lateral movement. The platforms are adjusted in separable height by a variety of methods such as a micrometer, a hand screw or pneumatic, hydraulic or electromechanical actuators. A second embodiment utilizes the same principles except the platforms are square in shape and only two hinge plate sets are required on two adjacent sides of each platform.

17 Claims, 5 Drawing Sheets

Z-AXIS PRECISION POSITIONER

TECHNICAL FIELD

The present invention relates to a parallel positioner in general. More specifically to a Z-axis positioner that maintains a precise parallel relationship between two platforms while expanding or contracting in the Z-axis.

BACKGROUND ART

Previously, many types of mechanisms have been used to provide an effective means of maintaining a parallel relationship of at least one pair of flat platforms while permitting expansion or contraction of movement in a straight line or in a Z-axis linear direction. Most prior art has utilized arms, jointed at the ends, in concert to achieve this motion. The field of robotic manipulators has been replete with this type of device, however in most cases little consideration has been given to maintain a precise relationship or parallelization on an accurate linear and tilt-free translation useful to precision equipment.

A search of the prior art did not disclose any patents that read directly on the claims of the instant invention, however the following U.S. patents are considered related:

| Patent No. | Inventor | Issue Date |
| --- | --- | --- |
| 5,721,616 | Domenicali | Feb. 24, 1998 |
| 5,237,887 | Appleberry | Aug. 24, 1993 |
| 5,156,062 | Appleberry | Oct. 20, 1992 |
| 4,976,582 | Clavel | Dec. 11, 1990 |
| 4,806,068 | Kohli et al. | Feb. 21, 1989 |
| 4,651,589 | Lambert | Mar. 24, 1987 |
| 4,248,103 | Halsall | Feb. 3, 1981 |
| 2,569,354 | Tracy | Sep. 25, 1951 |
| 2,506,151 | Hoven et al. | May 2, 1950 |
| 2,338,533 | Pash | Jan. 4, 1942 |
| 2,198,635 | Rossman | Apr. 30, 1938 |

Domenicali in U.S. Pat. No. 5,721,616 teaches a tilt-free linear micromotion translator such as an optical element, which includes a flexural suspension connected to a workpiece along a predetermined transitional axis. The flexural suspension utilizes a number of flexural links connecting points on a fixed rigid frame member. The links lie in a pair of parallel planes with the transitional axis normal to the paralleled planes. The device includes a linear motion transducer to the suspension, enabling tilt-free linear micromotion.

U.S. Pat. No. 5,237,887 issued to Appleberry discloses an apparatus which includes a static base, a platform, a first arm assembly, and a second arm assembly. The first arm assembly has a first terminal portion pivotally connected at a first pivot point to a first portion of the static base and a second terminal portion pivotally connected to the platform at a second pivot point. The first arm assembly is constructed to permit changes in the distance between the first and second pivot points, but is concomitantly constrained to movement in a desired first plane. The second arm assembly has a respective first terminal portion pivotally connected at a third pivot point to a second portion of the static base and a respective second terminal portion pivotally connected to the platform at a fourth pivot pointy. The second arm permits changes in the distance between the third and fourth pivot points but is constrained to movement in a desired second plane which is angularly disposed from the first plane. The motion of the platform is constrained to a straight line when the distance between the first and second pivot points and/or the distance between the third and fourth pivot points is changed.

U.S. Pat. No. 5,156,062 issued to Appleberry discloses an apparatus for maintaining the angular position of a platform during motion of the platform in any direction relative to a base. The apparatus includes a static base, a platform, a first arm assembly, a second arm assembly and a third arm assembly. Each arm assembly has one terminal portion connected to a portion of the static base, by a first universal joint and another terminal portion, connected to the platform, by a second universal joint. Each arm assembly is constructed to permit changes in the distance between its universal joints, but concomitantly removes a degree of angular freedom from the platform. The angular position of the platform is thereby maintained when the distance between the respective universal joints is changed.

U.S. Pat. No. 4,976,582 issued to Clavel includes a base element and a movable element along with three arms mounted with three shafts attached with linking bars forming connecting assemblies. The inclination and orientation of the moveable element remains unchanged regardless of the motion of the three control arm assemblies. The movable element supports a working element of which the rotation is controlled by a fixed motor situated on the base element.

U.S. Pat. No. 4,806,068 of Kohli et al. discloses a robotic manipulator for supporting a workpiece. The manipulator has a rotary linear actuator mounted on a base providing controlled movement of a link with two degrees of freedom. The link has one end spherically joined to a movable member which supports a workpiece. The link is articulated with the opposite end supported by a linear actuator.

Lambert in U.S. Pat. No. 4,651,589 teaches a polyarticulated mechanism having three legs situated in separated planes and formed in two parts, each associated on a spherical end and the other end to an endmost piece.

U.S. Pat. No. 4,248,103 issued to Halsall is for linkage mechanisms for industrial manipulators of the straight line conchoid type. The linkage mechanisms move in straight lines without the use of lead screws of revolute jointed arms.

For background purposes and as indicative of the art to which the invention is related reference may be made to the remaining cited patents issued to Tracy, Hoven et al., Pash and Rossman.

DISCLOSURE OF THE INVENTION

Many positioners have been developed for moving a working platform in an up and down direction or in the so called z-axis or for adjustments in precision equipment such as optics and the like. The problem is to accomplish this task with smooth movement without disproportionate hysteresis and very accurate parallelism. It is therefore the primary object of the invention to provide a positioner that overcomes all of these problems and also includes many other peripheral advantages. This is accomplished by using a flexible pivot hinge arrangement with crossed strip hinges on opposed edges of a hinge plate attached to the sides of a pair of opposed platforms. The invention, as presented, therefore requires no lubrication, and has no rolling friction or sliding of contiguous components. Further, the arrangement provides extremely long cycle life as only the axial bending of spring steel strip hinges is utilized which is not only within the normal characteristic capabilities of a material but is well within its flexural range.

An important object of the invention is the radial and axial stiffness of the positioner and its predictable and repeatable performance. The opposed platforms not only have these desirable attributes but also provide accuracy in a parallel plane with a minimum of ±5 arc seconds tilt throughout the entire travel of the device from the collapsed state where both platforms are touching to the fully extended position.

Another object of the invention is directed to its adaptability to be used in different industries since it is easy to manufacture and relatively cost effective. The primary usefulness of the positioner is for optical devices, such as reflective telescopes, where it is utilized as a compliant focuser which has a hollow arbor attached through a hole in the top platform anchoring a perforated primary mirror such as found in a cassigrain telescope. The bottom platform of the invention is mounted on a threaded backplate that interfaces with the rear of a telescope enclosure tube. The eyepiece is connected to the arbor and distends through a centrally located hole in the bottom platform. It should be noted that the platform must remain parallel throughout its entire travel in order to maintain concentricity with the mirrors, which the invention accomplishes with ease. Another application of the positioner is for testing fixtures for printed circuit boards where in-line integrated circuit packages are used for testing integrated circuits allowing continuity to be established between the traces of the substrate of chip-carrier mounted integrated circuits and the like. This measurement is conducted using a plurality of spring-loaded probes or bed-of-nails contactor fixture or collapsing column probes on a fixed point probe card and bringing a sample into contact using a movable tool. The probe card and test sample must be parallel and precise in order to align properly throughout the entire printed circuit; as misalignment or too much pressure may penetrate the chip node points or inspection points and destroy the item under test. As the invention maintains accurate parallelism of its mounting platforms and its movement is precise, the application in this industry is ideal. In a more rugged mechanical application, bicycle derailers require parallel movement to shift from one sprocket to another, which could use the principles taught herein. While only a few uses have been previously mentioned, it is not to be construed to be limited to the above as many other applications could be equally well suited for the invention.

Still another object of the invention is the adaptability of the positioner to be adjusted in separable height by many different types of mechanical devices. This feature is highly desirable as the hinge arrangement requires only a single point, anywhere on the inner facing surfaces between the platforms to be used, as no binding or diagonal torque is produced as normally found in conventional single pin leaf hinges. This characteristic is extended even beyond the normal boundaries of the platforms as a cantilever arm may be added to each platform, thus permitting the adjustment to be positioned away from the working area of the positioner. This flexibility permits the adjustment device to be positioned on either platform and may use gravity or springs to return the top platform to a lower position. One such device is a conventional depth micrometer, preferably with a full or half base permitting easy attachment. A rotating rod may be used with a mating pin preferably with a cone point or the non-rotating blade type may be utilized interfacing directly with the mating platform. A simple threaded rod or a full threaded screw may also be used for the adjustment means. These threaded fasteners are simple, having a rather basic function, and are also available with a myriad of heads or attached knobs for manual manipulation. One drawback to threaded rods or screws is that the threads may contain a certain amount of backlash and unwanted movement when reversing directions, along with minute longitudinal play. If the tolerance is allowable, this type of adjustment is fully acceptable and certainly the least expensive. Double acting air pistons, hydraulic cylinders and electromechanical linear actuators may be used with equal ease depending upon the application, or any other type of adjustment method may be an acceptable substitute.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 13:
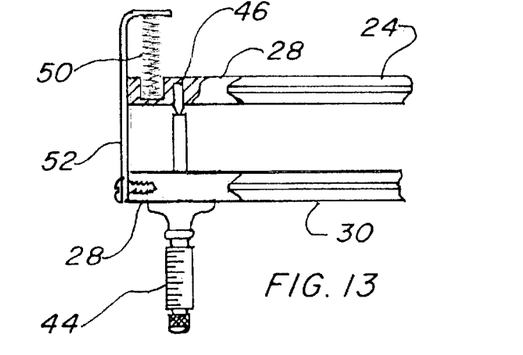
FIG. 13 is an arbitrary cross-sectional view of a cantilevered arm with a spring loaded depth micrometer illustrated as the adjustment means.
Figure 15:
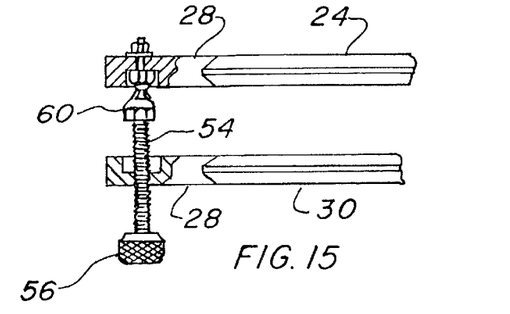
FIG. 15 is an arbitrary cross-sectional view of a cantilevered arm with a threaded shaft in the form of a knurled head screw and a ball joint control swivel illustrated as the adjustment means.

The best mode for carrying out the invention is presented in terms of a preferred and a second embodiment. Both embodiments maintain a precise parallel relationship between two platforms and are basically alike except the second embodiment utilizes a pair of square shaped platforms with only two sets of hinge plates instead of the preferred triangular, shaped platforms with hinge plates on all three sides. The preferred embodiment is shown in FIGS. 1 through 17 and is comprised of a top platform 24 preferably triangular or as in the second embodyment square in shape. The platform 24 is thick enough to have coequal opposed beveled edges 26 that permit mounting of separate elements thereupon. The corners of the triangular top platform 24 may be sharp, coming to a point as illustrated in FIGS. 1–6 and 11, truncated or truncated with at least one corner having an optional cantilevered beam 28 extending outward as depicted in FIGS. 13 and 15. The beveled edges 26 are coequal on the three sides and are integrally formed into the top platform 24 as it possesses sufficient thickness for that purpose.

A bottom platform 30 is formed identical to the top platform 24, only in mirror image, including the coequal opposed beveled edges 26 and optional cantilevered beam 28, if desired. In both top and bottom platform 24 and 30 the integral coequal opposed beveled edges 26 are angled from 40 to 50 degrees, with 45 degrees preferred, as illustrated best in FIGS. 4 and 5. The preferred material for both the top and bottom platforms 24 and 30 is metal such as aluminum or steel of a thickness applicable to the task at hand. The platforms 24 and 30 may have attachment holes and clearance openings in the exposed surfaces according to their intended usage and as each may be completely different no effort has been made to illustrate this feature, since the application may be extended to such diversified fields as optical instruments, wafer testing and derailers etc. each having specific interface requirements.

Figures 6, 7, 8:
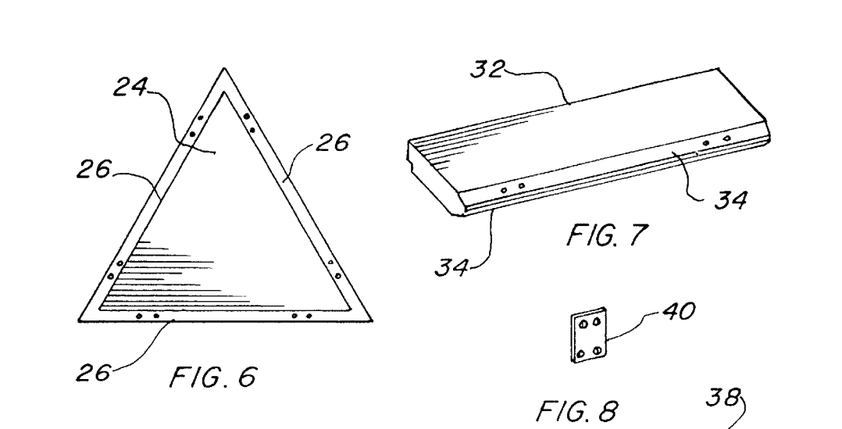
FIG. 6 is a plan view of the top platform completely removed from the invention for clarity.
FIG. 7 is a partial isometric view of the top hinge plate completely removed from the invention for clarity.
FIG. 8 is a partial isometric view of a strip hinge completely removed from the invention for clarity.
Figures 9, 10:
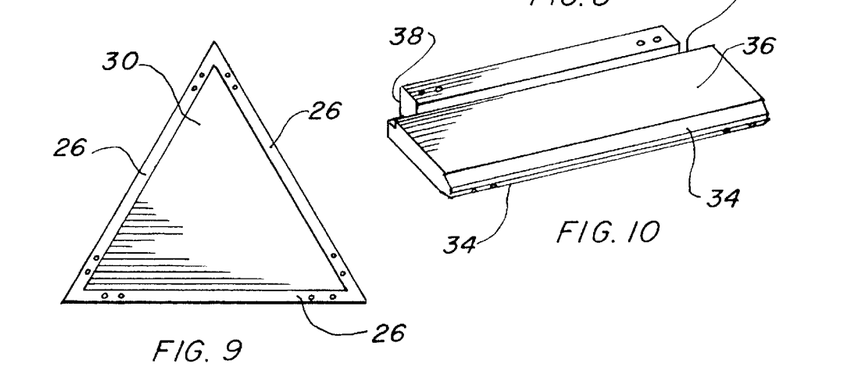
FIG. 9 is a plan view of the bottom platform completely removed from the invention for clarity.
FIG. 10 is a partial isometric view of a bottom hinge plate completely removed from the invention for clarity.
Figure 11:
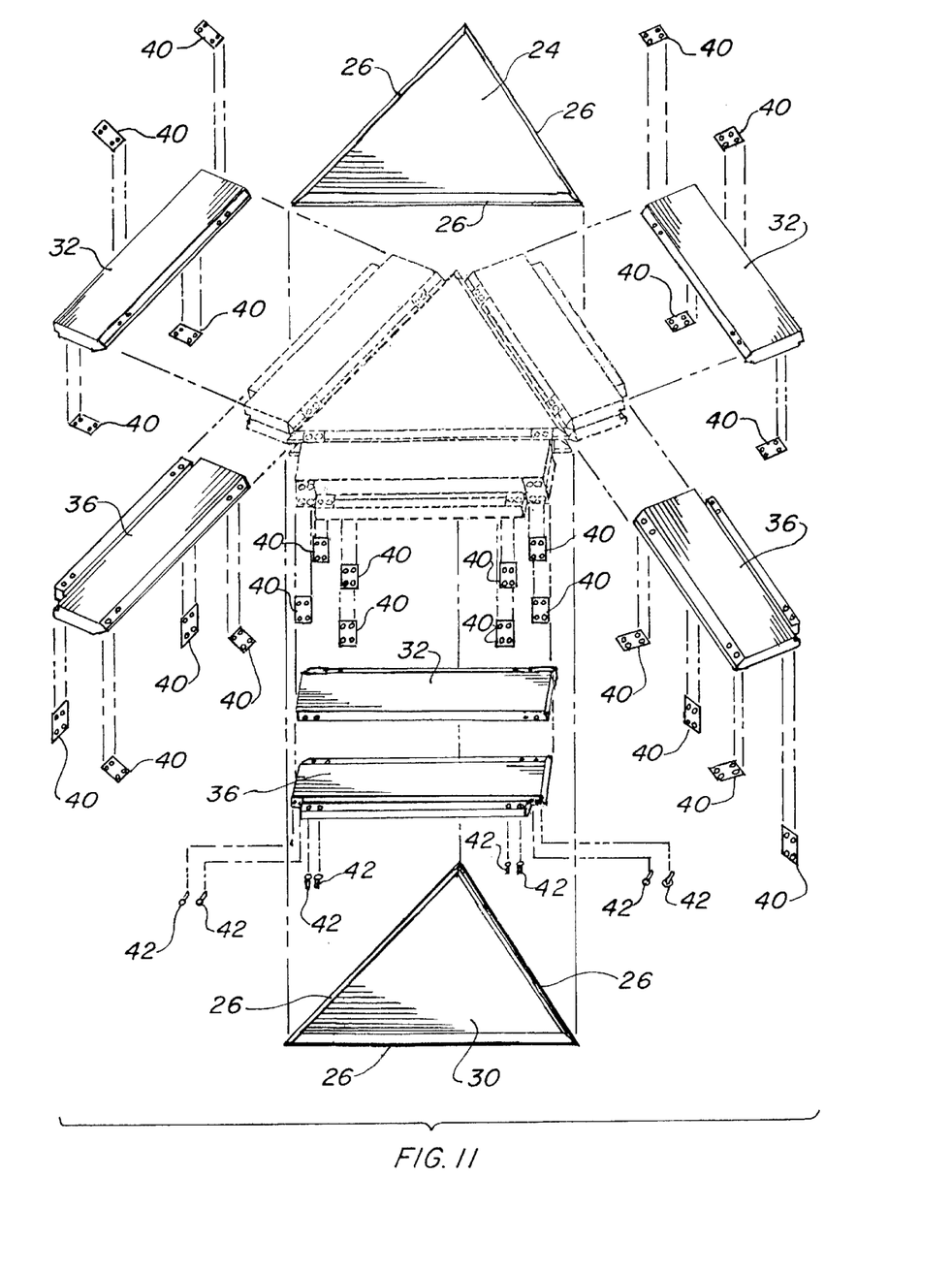
FIG. 11 is an exploded view of the preferred embodiment, less the adjustment means.

A plurality of rectangular hinge plates, basically the same thickness as the platforms, are positioned adjacent to and parallel with the beveled edges 26 of each platform 24 and 30. Three top hinge plates 32 have three sides equilateral and one side having coequal opposed bevels 34 integrally formed therewith and similar to the beveled edges 26 of the platforms as illustrated in FIG. 7. Three bottom hinge plates 36 are positioned adjacent to the bottom platform 30 with the only difference in the shape being that the top hinge plate 32 is completely rectangular and the bottom plate 36 has the corners opposite the bevels 34 notched 38 as shown in FIG. 10. The notches 38 provide a surface parallel with the width of the top hinge plate 32, as the bottom hinge plate 36 is slightly wider in its rectangular shape. The added width and length of the notch 38 is approximately equivalent to the thickness of the bottom hinge plate 36 making it somewhat wider than the top plate 32 beyond the notches in each corner. The purpose of the notches 38 will later become apparent for use with the attachment means. The hinge plates 32 and 36 are only adjacent to, but not touching the platforms, as the separation is necessary for the attachment means. While three sets of hinge plates are described above it should be noted that the invention will also function properly with only two sets of hinge plates in this triangular platform configuration. It has been proven effective to utilize rectangular hinge plates 32,36 having a length-to-width ratio from 3.5 to 5. However, any practical length-to-width ratio can be utilized.

Figure 1:
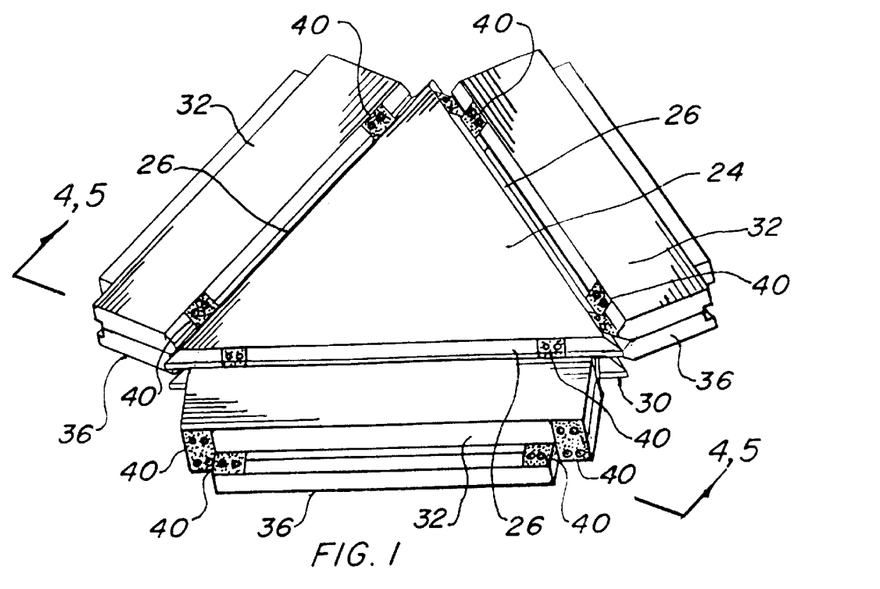
FIG. 1 is a partial isometric view of the preferred embodiment less the adjustment means.
Figure 2:
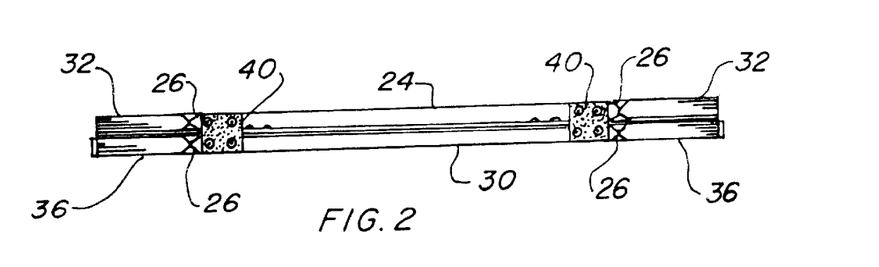
FIG. 2 is a side elevation view of the preferred embodiment, less the adjustment means, shown in the retracted or minimum height position.
Figure 3:
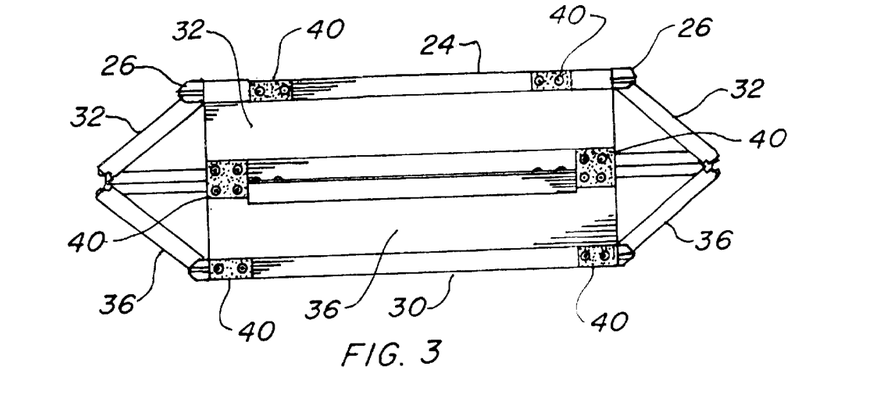
FIG. 3 is a side elevation view of the preferred embodiment, less the adjustment means, shown in the expanded or maximum height position.
Figure 4:
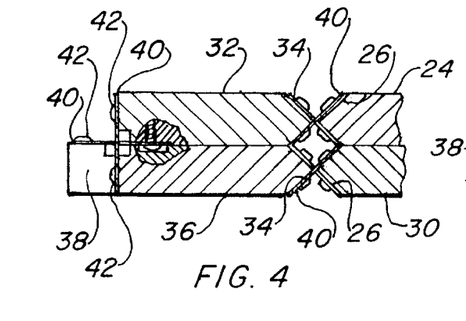
FIG. 4 is a cross-sectional view taken along lines 4—4 of FIG. 1 with the positioner in the retracted position.
Figure 5:
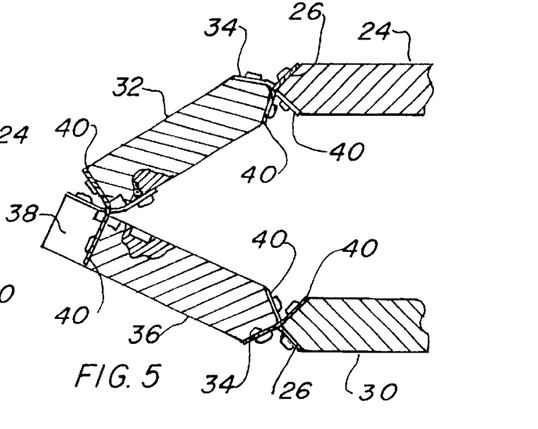
FIG. 5 is a cross-sectional view taken along lines 4—4 of FIG. 1 with the positioner in the expanded position.

A plurality of flexural strip hinges 40 are attached in crossed pairs to the opposed beveled edges 26 of the top and bottom platforms 24 and 30, and are adjacent to the top and bottom hinge plate opposed bevels 34. Further, the opposite sides of the hinge plates 32 and 36 are attached in side by side pairs of hinges 40 such that the top and bottom platforms 24,30 maintain a parallel relationship when separated. This function is achieved by a dual opposed side containment of the strip hinges, thus eliminating lateral movement while allowing angular flexing of the hinges. It should be noted that the strip hinges 40 on the sides of the hinge plates opposite the bevels 34 are attached horizontally and vertically, as illustrated in FIG. 4, which is allowed by the orientation of the corner notches 38. As the hinges 40 are flexible and preferably made of spring steel of a thickness allowing axial bending with retained structural strength, a strong and durable joint is formed that is capable of repetitious elastic movements, thereby permitting the platforms to be repositioned an infinite number of times without fatigue of the hinge material. It has been found that a positioner having a 6.82 inch (17.32 cm) sided triangular platform functions ideally with a hinge 40 that is 0.50 inches (1.27 cm) wide and from 0.010 to 0.006 inches (0.025 to 0.015 cm) thick. Fastening means in the form of threaded fasteners 42 or the like attach the hinges 40 to the adjoining surfaces in order to achieve the proper functioning relationship. In the preferred embodiment twelve separate hinges 40 are utilized, four on each hinge plate pair, and a plurality of threaded fasteners 42 are utilized to complete the attachment to their respective surfaces. The threaded fasteners 42 are preferably button head screws as illustrated, however, any type of fastener may be used with equal ease When the platforms and hinge plates are attached with their corresponding hinges, the platforms are separable in a parallel plane within ±5 arc seconds tilt as tested in a 6.82 inch (17.32 cm) triangular platform configuration. It has also been found in the above embodiment that the vertical x-axis movement or travel is 2.25 inches (5.72 cm) with a 45 degree bevel on adjoining surfaces, and in a retracted position the height is the combined stature of the two platforms which in this case is 0.80 inches (2.03 cm).

Figure 21:
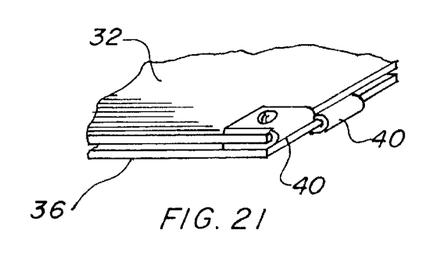
FIG. 21 is a partial isometric view of another embodiment, utilizing relatively thin platforms and hinge plates with the hinges attached in crisscross fashion.
Figure 22:
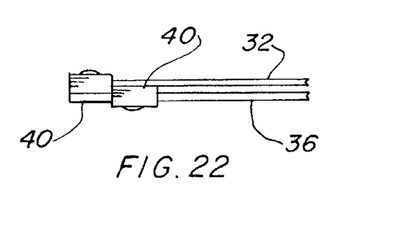
FIG. 22 is a side view of the embodiment of FIG. 21.

It should also be noted that while the thickness of the structure is noted and hinges 40 are positioned on bevels and vertical edges, it is still within the scope of this invention to utilize relatively thin top and bottom platforms 24 and 30 as well as the hinge plates 32 and 36 and mount the hinges 40 with rivets and the like in crisscross fashion on the opposite sides of the structure as illustrated in FIGS. 21 and 22.

Figure 12:
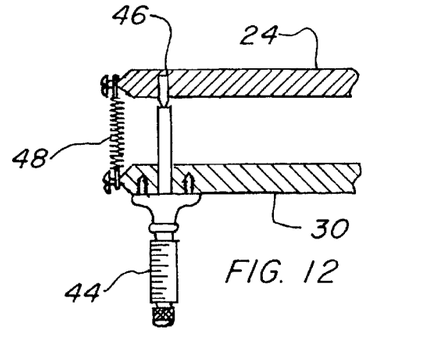
FIG. 12 is an arbitrary cross-sectional view of the top and bottom platform with a depth micrometer illustrated as the adjustment means.

Adjustment means are positioned contiguous with both the top platform 24 and bottom platform 30 for separating the platforms in a continuously regulated and precise manner. It has been found that the platforms remain parallel with the unique positioning of the hinges 40 and in some applications the workpiece itself may become the adjustment, as the platforms may be separated with the bottom platform 30 attached to a base of sorts and the top platform 24 to the workpiece, which has its own integral adjustment relative to height. In most applications however the platforms must be separated by some external method which may include a myriad of different height regulating elements according to the accuracy and control desired. Since the platforms are always parallel it is not necessary to adjust the separation in more than one point and this position may be located anywhere on the surface of the platform or even remote from the main surface as long as it is on the same plane. FIGS. 12 and 13 illustrate one type of adjustment means using a depth micrometer 44 mounted on one platform with its spindle penetrating therethrough and friction limiting means in the form of a conical ended pin 46 imbedded into an opposed platform. If the workpiece has sufficient mass to lower the top platform 24 by its own weight when adjusted downward, no return means is required, however if not, a spring return may be utilized. FIG. 12 illustrates this spring return option, wherein a tension spring 48 is attached on the edges of the platforms 24 and 30, preferably on the corners where the triangle shape may be slightly truncated. FIG. 13 depicts another approach with a compression spring 50 used in conjunction with an external bracket 52 to accomplish the same result.

Figure 14:
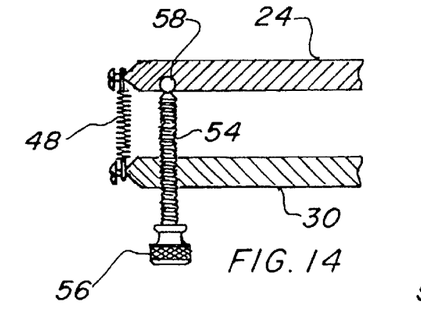
FIG. 14 is an arbitrary cross-sectional view of the top and bottom platform with a threaded shaft in the form of a knurled head screw illustrated as the adjustment means.

FIG. 14 shows the adjusting means using a threaded rod 54 disposed through the bottom platform 30 with the top platform 24 having rotating means interfacing with the rod. In this case the rod 54 is a knurled head screw 56 and the rotating means is a ball detent 58. FIG. 15 employs the corresponding features with the threaded rod 54 in the form of an identical knurled head screw 56 except it is threadably attached to a ball joint control swivel 60 having such as integral resilient disc cushions. The male threaded end of the swivel 60 is screwed into the top platform 24 and the female end is attached to the screw 56.

Figure 16:
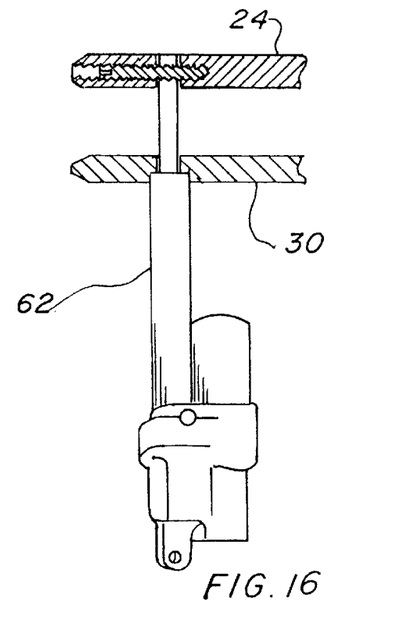
FIG. 16 is an arbitrary cross-sectional view of the top and bottom platform with a linear actuator illustrated as the adjustment means.

A linear actuator 62 may also be utilized as the adjustment means as shown in FIG. 16. With this electromechanical device the-shaft may be attached to the top platform 24 with a pin or set screw as shown, and its operation is well known in the art.

Figure 17:
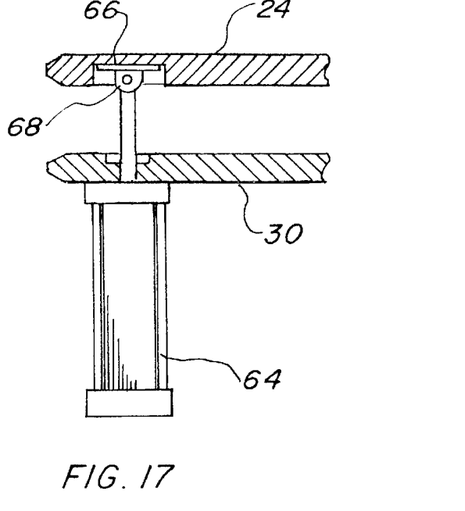
FIG. 17 is an arbitrary cross-sectional view of a cantilevered arm with a air cylinder illustrated and a clevis as the adjustment means.

FIG. 17 illustrates yet another embodiment of the adjustment means using an air cylinder 64 with piston rod clevis 66 and bracket 68 with a pin. The air cylinder 64 is attached in a similar manner as above, this cylinder is well known in the art for its functional operation and utility. While pneumatic pressure is preferred hydraulic energy may be used with equal ease.

It will be clearly seen that the applicable devices and combinations are limitless as far as the adjustment means are concerned. The mounting location is also broad in its scope even including a cantilevered beam 28 that may extend outward from both the top platform 24 and the bottom platform 30 as shown in FIGS. 13 and 15. The actual configuration of the beam 28 is normally dependent upon the application as its location relative to the platforms is not critical as long as they are planar, thus they may be positioned above or below the existing surfaces as required. With the triangular platforms one of the corners is the optional location for the beam 28.

Figure 18:
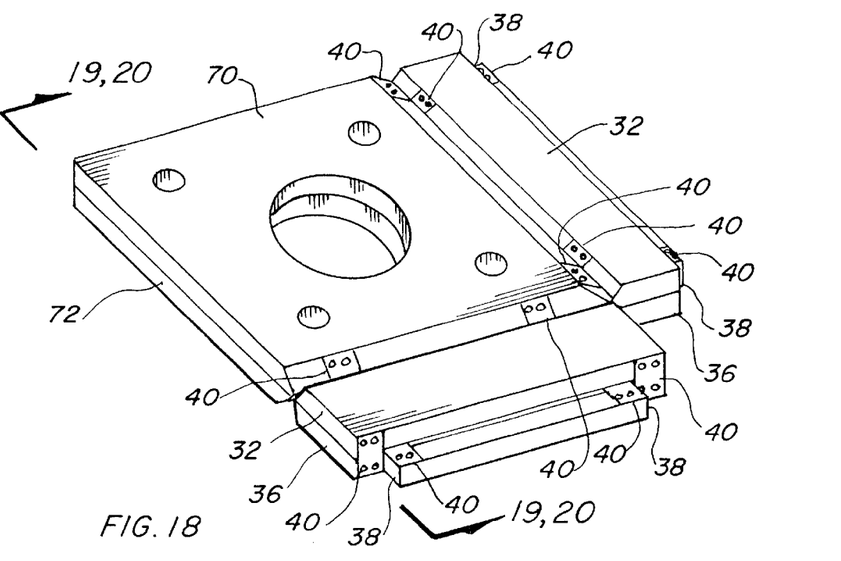
FIG. 18 is a partial isometric view of the second embodiment, less the adjustment means.
Figure 19:
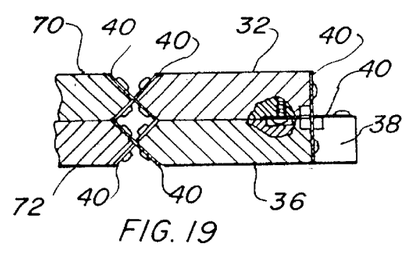
FIG. 19 is a cross-sectional view taken along lines 19—19 of FIG. 18, with the positioner in the retracted position.
Figure 20:
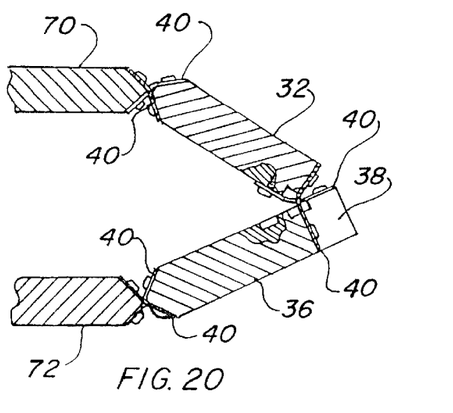
FIG. 20 is a cross-sectional view taken along lines 20—20 of FIG. 18, with the positioner in the expanded position.

The second embodiment of the invention is illustrated in FIGS. 18–20 and differs in the shape of the top and bottom platforms as they are square instead of triangular. The top square platform 70 as illustrated in FIG. 18 shows a plurality of holes for mounting a workpiece and the bottom square platform 72 has similar openings, however these are only representative. Only two sets of hinge plates 32 and 36 are required and the platforms have only two sides with beveled edges 26. While it appears on the surface that this embodiment would be unbalanced, this is not the case, as it functions equally well in parallelism as its counterpart in the triangular configuration. While a square platform is preferred any polygonal shaped platform may be used with equal ease.

In operation the bottom platform 30 is attached to a base and the top platform 24 has the workpiece attached as required, an operator either manually adjusts the height by rotating a knob or handle or in the case of a pneumatic, hydraulic or electric actuator by some remote means. It may be seen that the function and utility is obvious to one skilled in the art to which the invention is directed.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A z-axis positioner for parallel extension and contraction adjustment comprising:
    a) a top platform having at least three sides and at least two of the three sides having coequal opposed bevels integrally formed therewith,
    b) a bottom platformn juxtaposed with said top platform, the bottom platform having at least three sides and at least two of the three sides having coequal opposed bevels integrally formed therewith,
    c) a plurality of rectangular hinge plates having three sides equilateral and one side having coequal opposed bevels integrally formed therewith, each hinge plate beveled side positioned adjacent to and parallel with the beveled sides of each platform,
    d) a plurality of flexural strip hinges attached in crossed pairs to opposed beveled sides of said platforms and adjacent hinge plates, also attached on opposite sides of said hinge plates in side by side pairs such that the top and bottom platforms maintain a parallel relationship when separated, achieved by a dual opposed side containment of the strip hinges, thus eliminating lateral movement while allowing angular flexing of the hinges, and
    e) adjustment means contiguous with both top and bottom platforms for separating the platforms in a regulated and precision manner.

2. The z-axis positioner as recited in claim 1 wherein said top and bottom platform have a triangular outline with three sides having coequal opposed bevels integrally formed therewith.

3. The z-axis positioner as recited in claim 1 wherein said top platform and bottom platform have a square outline with two sides having coequal opposed bevels integrally formed therewith.

4. The z-axis positioner as recited in claim 1 wherein said top platform and bottom platform have a polygonal outline with two sides having coequal opposed bevels integrally formed therewith.

5. The z-axis positioner as recited in claim 1 wherein said top platform and bottom platform are formed of metal.

6. The z-axis positioner as recited in claim 1 wherein said top platform, bottom platform and hinge plate coequal opposed bevels are angled from 40 to 50 degrees.

7. The z-axis positioner as recited in claim 1 wherein each strip hinge is attached to the platforms and hinge plates with fastening means.

8. The z-axis positioner as recited in claim 1 wherein said strip hinge is comprised of spring steel.

9. The z-axis positioner as recited in claim 1 wherein said adjustment means further comprising a depth micrometer mounted on one platform and friction limiting means interfaced on an opposed platform.

10. The z-axis positioner as recited in claim 1 wherein said adjustment means further comprising a threaded rod disposed through one platform with an opposed platform having rotating means, in the form of a ball detent, interfacing with the rod.

11. The z-axis positioner as recited in claim 1 wherein said adjustment means further comprising a linear actuator mounted on one platform for interfacing with an opposed platform.

12. The z-axis positioner as recited in claim 1 wherein said adjustment means further comprising an air cylinder mounted on one platform interfacing with an opposed platform.

13. The z-axis positioner as recited in claim 1 wherein said adjustment means further comprising an hydraulic cylinder mounted on one platform interfacing with an opposed platform.

14. The z-axis positioner as recited in claim 1 further comprising a cantilevered beam extending outwardly from both the top platform and the bottom platform for mounting adjustment means thereupon.

15. The z-axis positioner as recited in claim 1 wherein said top platform and said bottom platform are adjustably parallel within ±5 arc seconds tilt.

16. A z-axis positioner for parallel extension and contraction adjustment comprising:

a) a top platform having sides, with bevels integrally formed on said sides, b) a bottom platform having sides, juxtaposed with said top platform, also bevels integrally formed on said sides, c) a plurality of rectangular hinge plates having one side beveled, each beveled side positioned adjacent to and parallel with the beveled sides of each platform, d) a plurality of flexural strip hinges attached to opposed beveled sides of both platforms and adjacent beveled side of the hinge plates, also attached on opposite sides of said hinge plates such that the top and bottom platforms maintain a parallel relationship when separated, achieved by a dual opposed side containment of the strip hinges thus eliminating lateral movement while allowing angular flexing of the hinges, and e) adjustment means contiguous with both top and bottom platforms for separating the platforms in a regulated and precision manner.

17. A z-axis positioner for parallel extension and contraction adjustment comprising:

a) a top platform having sides, b) a bottom platform having sides, juxtaposed with said top platform, c) a plurality of rectangular hinge plates positioned adjacent to and parallel with the sides of each platform, d) a plurality of flexural strip hinges attached to the sides of both platforms and adjacent plates also attached on opposite sides of said hinge plates such that the top and bottom platforms maintain a parallel relationship when separated, achieved by a dual opposed side containment of the strip hinges, thus eliminating lateral movement while allowing angular flexing of the hinges, and e) adjustment means contiguous with both top and bottom platforms for separating the platforms in a regulated and precision manner.

* * * * *